United States Patent [19]

Richman

[11] 4,180,865
[45] Dec. 25, 1979

[54] PORTABLE MULTIPLEX BUS EXERCISER
[75] Inventor: Jay L. Richman, Montville, N.J.
[73] Assignee: The Bendix Corporation, Teterboro, N.J.
[21] Appl. No.: 946,286
[22] Filed: Sep. 27, 1978
[51] Int. Cl.² .............................................. G11C 13/00
[52] U.S. Cl. ...................................... 365/63; 365/191
[58] Field of Search ....................... 365/45–48, 365/52, 63, 189, 191

[56] References Cited
U.S. PATENT DOCUMENTS 3,638,007  1/1972  Brooks ................................... 365/45

Primary Examiner—Terrell W. Fears
Attorney, Agent, or Firm—Anthony F. Cuoco; William F. Thornton

[57] ABSTRACT

A portable multiplex bus exerciser for exercising any digital communications multiplex bus having a system under test which is of the command/response type. A command word and an optional data word, programmable as to address, message length, and data content, are applied to either of two multiplex buses. By examining the activity of a bus line (or lines) the responses of the system under test can be analyzed to determine its operational readiness.

7 Claims, 5 Drawing Figures

PORTABLE MULTIPLEX BUS EXERCISER

FIELD OF THE INVENTION

This invention relates to digital communications systems, and more particularly to a digital communications multiplex bus having a system interface of the command/response type. More particularly, this invention relates to a portable, economical multiplex bus exerciser for exercising any digital communications multiplex bus of the type described.

DESCRIPTION OF THE PRIOR ART

Digital communications systems include multiplex buses whose system under test interface structure is of the command/response type. Typical of this interface structure is that defined in MIL-STD-1553A. In systems of this type, it is desirable to examine the activity of a bus line (or lines) so that the responses of the system under test can be analyzed to determine its operational readiness. Such devices, known as multiplex bus exercisers, are most desirably portable for factory or field use and must be economical to manufacture. Prior to the present invention, there has not been a multiplex bus exerciser to satisfy these criteria.

SUMMARY OF THE INVENTION

This invention contemplates a multiplex bus exerciser having a plurality of bit selection switches, timing and control logic, serial output registers, mode control logic, word select logic and channel drivers. The bit selection switches are operable for selecting a pattern which is entered, in parallel, into the serial output registers. The timing and control logic divides the output of an oscillator for providing signals at frequencies for proper system operation. Timing signals are applied to the mode control logic, and the word select logic provides a serial word. The mode control logic is switch operated to select the channel which is to output data, select "transmit" or "receive" modes, select "fast" or "slow" message repetition rates and engage "run" or "halt" modes.

The word select logic loads data and command words into the serial output registers and selects either a data word or a command word to be shifted therefrom. A pair of identical channel drivers drive output pulse transformers which are coupled to output jacks terminating in a predetermined resistance load which matches the transmission line of the system under test. The configuration described is included on a single circuit board within a compact chassis to insure portability, low cost construction and efficient maintainability.

DESCRIPTION OF THE INVENTION

Figure 1:
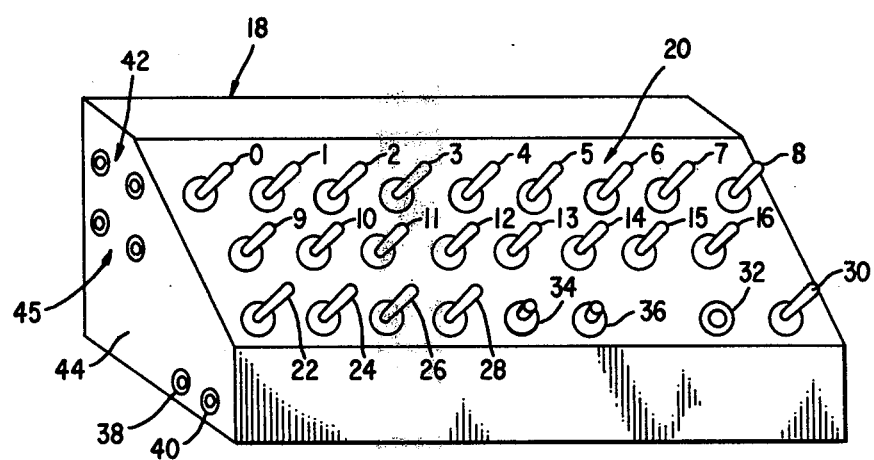
FIG. 1 is a pictorial representation showing the external configuration of a portable multiplex bus exerciser according to the invention.

With reference first to FIG. 1, a case 18 has a sloping front panel 20 which carries a plurality of command and data bit selection switches, shown for purpose of illustration as seventeen in number and having the numeral designations 0 through 16. The bit selection switches are toggle switches which are disposed in the "up" position, as shown in the Figure, to indicate a logic "one" state and in the "down" position to indicate a logic "zero" state.

Front panel 20 also carries toggle switches 22, 24, 26 and 28. Toggle switch 22 is actuated for selecting an appropriate output data channel of a pair of channels when in the "up" or "down" position through mode control logic as will be hereinafter explained. Toggle switch 24 renders the device in either transmit ("up") or receive ("down") modes, while toggle switch 26 selects "fast" ("up") or "slow" ("down") message repetition rates. Toggle switch 28 renders the device in the "run" ("up") or halt ("down") modes.

Front panel 20 further carries a power "ON" switch 30 and associated indicator light 32, and a data bit entry switch 34 and a command bit entry switch 36.

A side panel 44 of case 18 carries power jacks 38 and 40 which may be connected to a suitable +5 volt D.C. power supply. Panel 44 also carries bus channel output jacks 42 and 45. The circuitry of the invention as particularly illustrated in FIGS. 3, 4 and 5 is disposed within case 18.

Figure 2:
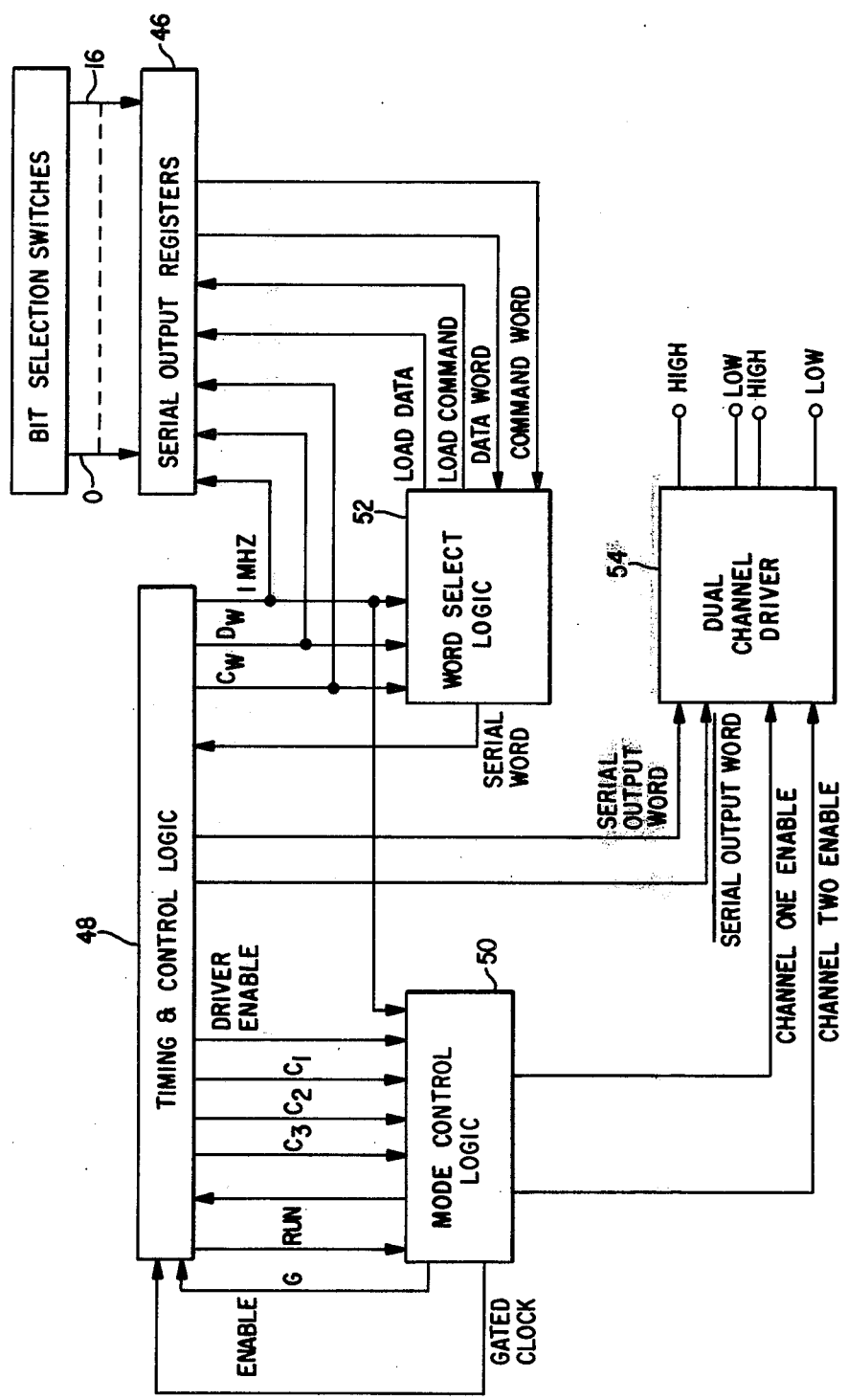
FIG. 2 is a block diagram showing generally the structural relation of the bit selection switches, serial output registers, timing and control logic, mode control logic, word select logic and channel drivers included in the device of the invention.

With reference now to the block diagram of FIG. 2, bit selection switches 0 to 16 are connected to serial output registers designated generally by the numeral 46. The specific structural connections to the serial output registers are shown in FIG. 3.

Figure 3:
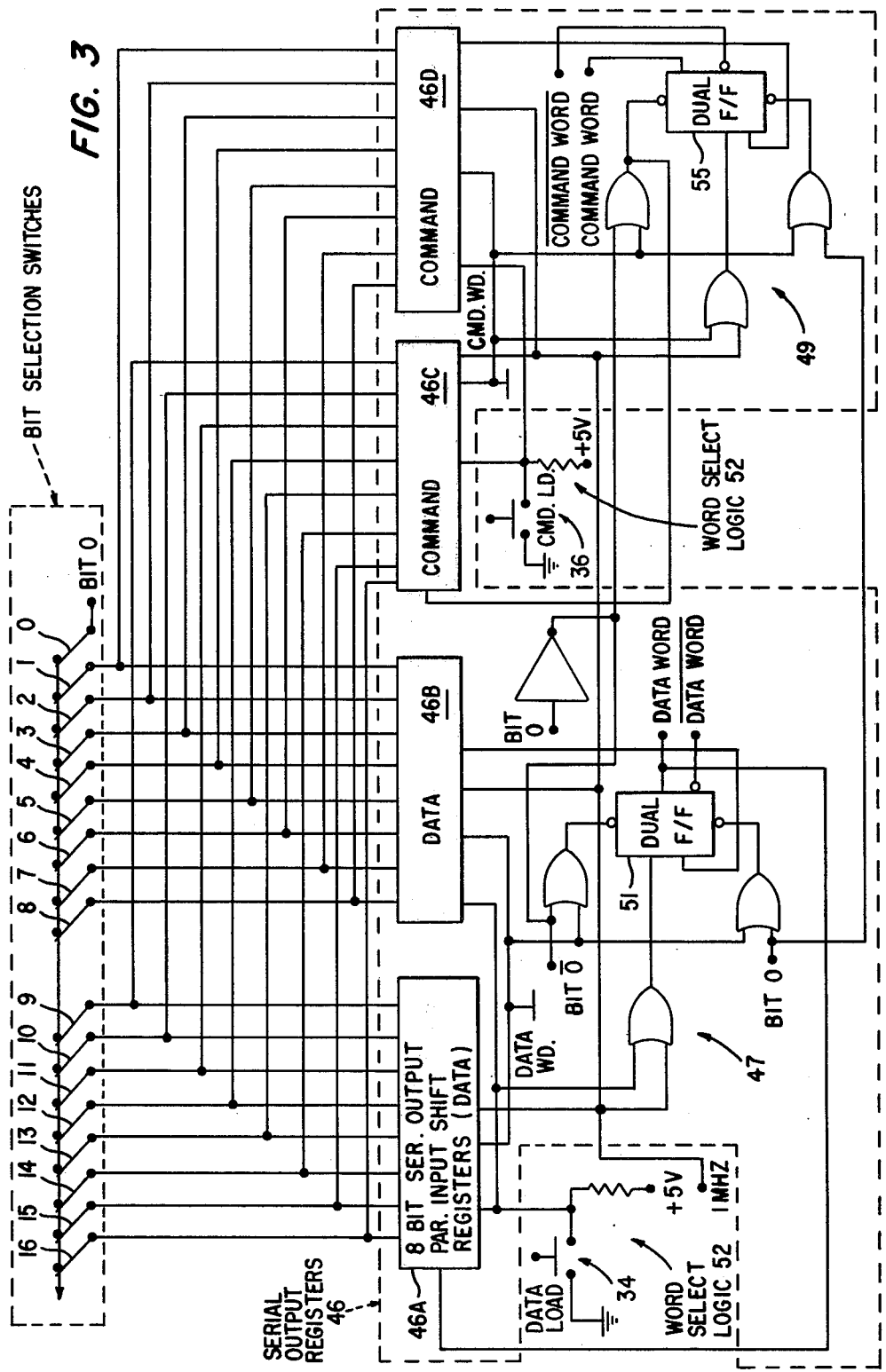
FIGS. 3, 4 and 5 are electrical schematic-logic diagrams showing the detailed configuration of the components generally illustrated in FIG. 2.

Thus, with specific reference to FIG. 3, bit selection switches 1–16 are connected to a pair of 8-bit serial output, parallel input data shift registers 46A and 46B and are connected to like command shift registers 46C and 46D. Bit selection switch 0 (BIT 0 and its complement $\overline{\text{BIT 0}}$) is connected through a gate arrangement 47 to a dual flip-flop 51 and driven by the outputs of registers 46A and 46B to output a data word and its complement. Bit selection switch 0 is connected through a like gate arrangement 49 to a dual flip-flop 55 and driven by the output of registers 46C and 46D to output a command word and its complement. Registers 46A and 46B are loaded when data bit entry switch 34 is momentarily depressed and a selected pattern is entered in parallel into the registers through the bit selection switches. When command bit entry switch 36 is momentarily depressed, a likewise selected pattern is entered in parallel into command registers 46C and 46D.

Figure 4:
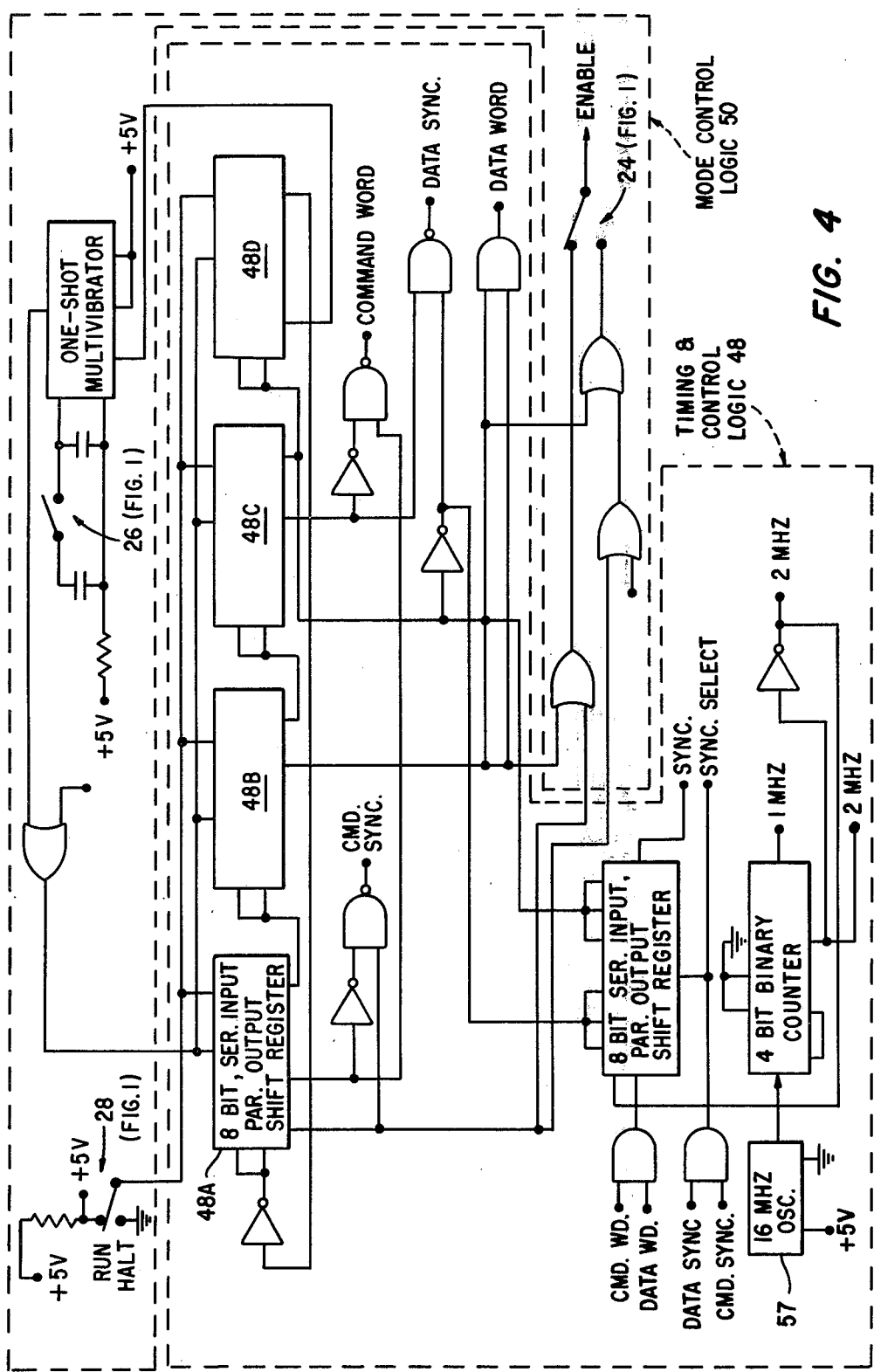
Figure 5:
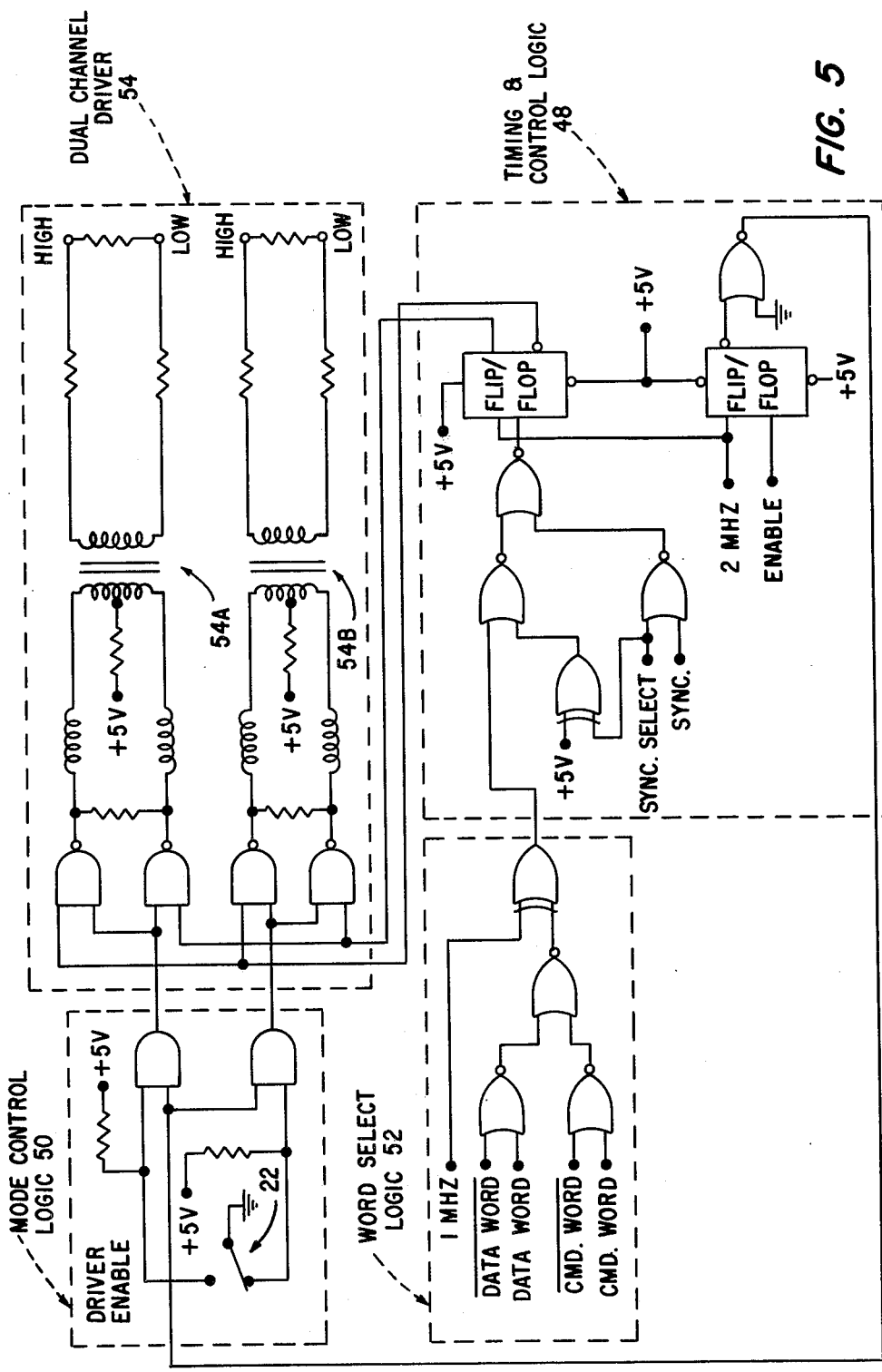

Timing and control logic designated generally by the numeral 48 in FIG. 2 and shown in substantial detail in FIGS. 4 and 5 divides the output of a 16 MHZ crystal oscillator 57 to 2 MHZ and 1 MHZ outputs for operation of the system, as shown in FIG. 4.

Timing and control logic 48 generates timing signals $C_1$, $C_2$, $C_3$, G (gap) and a driver enable signal which are applied to mode control logic 50 shown generally in FIG. 2. The generation of the aforenoted signals is provided through four 8-bit, serial input, parallel output shift registers 48A, 48B, 48C and 48D and the associated logic circuitry included in timing and logic control 48 shown in substantial detail in FIG. 4. Model control logic 50, also shown in substantial detail in FIG. 4, returns "enable", "gated clock" and "run" signals to timing and control logic 48. In addition, timing and control logic 48 generates a 1 MHZ clock signal for word select logic 52 and serial output registers 46.

A serial word from word select logic 52 is resynchronized through timing and control logic 48 before applying it as serial word output and its complement to dual channel driver 54. Mode control logic 50 selects the channel which is to output data through toggle switch 22 as shown (see FIG. 5). The other toggle switches are operable to perform the functions as aforenoted with reference to FIG. 1.

Word select logic 52 (FIG. 3) loads data and command words into serial output registers 46. Signals $C_W$ and $D_W$ from timing and control logic 48 (FIG. 2) select a data word or a command word, respectively, to be shifted from the serial output registers. As best shown in FIG. 5, dual channel driver 54 includes like channels 54A and 54B. Each channel comprises an open collector logic buffer which drives an output pulse transformer with complementary signals. Inductors provide rise and fall time shaping of the output waveform. Isolation resistors couple the transformer secondary to channel output jacks (high and low) which terminate in a 75 ohm load which matches the transmission line of the system under test.

The specific circuit and logic configuration as shown in FIGS. 3, 4 and 5 is applicable to a digital communications multiplex bus whose system under test interface conforms to the structure defined in MIL STD 1553A, i.e., an interface structure of the command/response type. It will be understood by those skilled in the art that different structural standards will result in different specific circuit and logic configurations, the same being within the scope of the invention as shown generally in FIG. 2.

What is claimed is:

1. An exerciser for exercising a digital communications multiplex bus, comprising:
   bit selection means operator-operable for selecting digital bits to provide digital word patterns;
   register means connected to the bit selection means for receiving the digital word patterns therefrom;
   word select means associated with the register means and operator-operable for rendering the register means operable for receiving the digital word patterns therefrom;
   timing means for providing timing signals;
   the word select means connected to the timing means and responsive to particular timing signals therefrom for shifting the selected digital word patterns from the register means to the timing means which synchronizes the selected shifted digital word patterns;
   a plurality of output channels connected to the timing means for receiving the synchronized digital word patterns therefrom; and
   control means connected to the timing means and to the plurality of output channels and responsive to other particular signals from the timing means for selecting at least one of the output channels to provide output signals for exercising the digital communications multiplex bus.

2. An exerciser for exercising a digital communications bus, as described by claim 1, wherein the bit selection means operator-operable for selecting digital bits to provide digital word patterns includes:
   a plurality of toggle switches, each of which is displaceable in one sense for providing a bit in a logic "one" state and displaceable in the opposite sense for providing a bit in a logic "zero" state to provide the digital word pattersn.

3. An exerciser for exercising a digital communications bus as described by claim 2, wherein:
   the plurality of toggle switches are displaced in the one and opposite senses for selecting digital bits to provide digital data and command word patterns.

4. An exerciser for exercising a digital communications bus as described by claim 3, wherein the register means connected to the bit selection means for receiving the digital word patterns therefrom includes:
   first serial input, parallel output shift registers for receiving the selected data word patterns and second serial input, parallel output shift registers for receiving the selected command word patterns.

5. An exerciser for exercising a digital communications bus as described by claim 4, wherein the word select means includes:
   a first switch operator-operable for rendering the first registers operable for receiving the selected data word patterns; and
   a second switch operator-operable for rendering the second registers operable for receiving the selected command word patterns.

6. An exerciser for exercising a digital communications bus as described by claim 1, wherein the timing means includes:
   means for providing output signals at a predetermined frequency; and
   means for dividing the frequency of the output signals to provide a plurality of operating signals at other predetermined frequencies.

7. An exerciser for exercising a digital communications bus as described by claim 6, wherein:
   the bit selection means operator-operable for selecting digital bits to provide digital word patterns includes means for selecting digital data and command word patterns;
   the word select means is responsive to particular operating signals from the timing means for selecting a digital data word pattern to be shifted from the register means to the timing means, and is responsive to other particular operating signals from the timing means for selecting a digital command word pattern to be shifted from the register means to the timing means, said timing means synchronizing the selected shifted digital data and command word patterns.

* * * * *